3,513,023
PROCESS FOR THE PRODUCTION OF
CRYSTALLINE FRUCTOSE
Theodor Kusch, Werner Gosewinkel, and Georg Stoeck, Mannheim-Waldhof, Germany, assignors to Boehringer Mannheim Gesellschaft mit beschrankter Haftung, a corporation of Germany
No Drawing. Filed Mar. 3, 1967, Ser. No. 620,240
Claims priority, application Germany, Apr. 29, 1966,
B 86,884
Int. Cl. C13f 1/02; C13k 9/00
U.S. Cl. 127—58                             12 Claims

ABSTRACT OF THE DISCLOSURE

Crystalline, anhydrous fructose in a stable and storable form can be recovered from aqueous fructose solutions having a pH of 3.5 to 8.0 and a fructose content of at least 95 percent referred to the dry material by a process in which such fructose solution is concentrated in vacuo so that the water content of the concentrate amounts to between 2 and 5 percent and the solutions cooled to a temperature of 60–85° C. seeded with crystalline fructose and stirred vigorously while the temperature is maintained at 60–85° C. In a comparatively short period of time, there is obtained a kneadable crystalline mass which after slow cooling, solidifies completely. The solid product following grinding and further drying at a temperature below 65° C. consists of anhydrous crystalline fructose.

---

This invention relates to a process for the production of crystalline fructose.

More particularly, the present invention relates to a process for the production of anhydrous, crystalline fructose from aqueous solutions, the fructose being obtained in a finely crystalline readily useable and storable form, and which process, because of its simplicity and economy, can be carried out on a large scale.

All of the known processes for the production of crystalline fructose serve for the isolation and purification of fructose by crystallization and, apart from the large expenditure of labor, material and time involved, result in considerable losses of fructose (see Ullmann's Encyklopaedie der techn. Chemie, 9, 660–663/1957). In particular, in the crystallization of fructose from aqueous solutions, considerable difficulties arise (Ullmann, loc. cit., 661). This is the reason why the process according to U.S. patent specification No. 2,588,449 disclosing the production of frutcose dihydrate from aqueous solutions has not been applied on a large scale. In addition to the long crystallization times of 24 to 36 hours which are required, there is also the difficulty that the dihydrate of fructose has such a low melting point that it is not suitable as a commercial product and that the dehydration of the dihydrate proceeds so slowly and is technically so difficult that, in practice, it cannot be carried out.

It is one object of the present invention to provide an improved process for the preparation of crystalline fructose.

Another object of the invention is to provide an improved process for the production of anhydrous, crystalline fructose from aqueous solutions thereof.

Still another object of the invention is to provide an advantageous, simple, and very effective process of making crystalline fructose from aqueous solutions thereof.

Other objects of the present invention and advantageous features thereof will become apparent as the description proceeds.

The instant invention resides in a process which eliminates or substantially minimizes the above-discussed problems with a resulting production of anhydrous crystalline fructose. Broadly, speaking, the process comprises concentrating an aqueous fructose solution having a pH value of between 3.5 and 8 and in which at least 95 percent of the dry matter is fructose in vacuo so that the water content of the concentrate amounts to between 2 and 5 percent and the solution thus obtained cooled to a temperature of 60–85° C. seeded with crystalline fructose and stirred vigorously while the temperature is maintained at 60–85° C. In a comparatively short time, there is obtained a kneadable crystalline mass which after slow cooling, solidifies completely and can be worked up to form a stable, storable anhydrous fructose.

These results were very surprising, because when fructose solutions of this type are concentrated in a vacuum and allowed to cool in a usual manner, the highly viscous liquid (syrup) obtained solidifies to give a glass-like material. Upon comminution and grinding of this glass-like material, there is obtained a hygroscopic powder which even becomes sticky in the grinding device, is difficult to handle and deliquesces upon storage in moist air. However, if in accordance with the invention, during the concentration of the above-mentioned fructose solutions, care is taken that the concentration is carried out to provide a water content of between 2 and 5 percent and the solutions are cooled to a temperature of 60–85° C. seeded with crystalline fructose and stirred vigorously while maintaining the temperature at 60–85° C., then, in a comparatively short period of time, there is obtained a kneadable, crystalline mass which, after slow cooling, solidifies completely.

The crystalline product so obtained can easily be crumbled or ground and, after subsequent drying at a temperature below 65° C., consists of a non-sticking, free-flowing, storable, finely-crystalline powder which, depending upon the degree of purity of the fructose solution used as starting material, consists almost completely of anhydrous, crystalline fructose.

Consequently, the process according to the present invention for the production of crystalline fructose from aqueous solution is characterized in that an aqueous fructose solution having a pH of 3.5–8 and a fructose content of at least 95 percent, referred to the dry matter, is concentrated in a vacuum to a water content of 2–5 percent, cooled to a temperature of 60–85° C., seeded with crystalline fructose and stirred at 60–85° C. until a kneadable crystalline mass is formed, this crystalline mass allowed to solidify slowly, then comminuted and subsequently dried at a temperature below 65° C.

Since no purification of the fructose is involved in the process according to the present invention, there can only be used as starting materials pure fructose solutions, such as are obtained, for example, by the process according to German patent application No. B 83,146 (U.S. application Ser. No. 569,326). In principle, however, it also is possible, by the process according to the present invention, to convert fructose solutions of other origin into crystalline products when such solutions are sufficiently free of impurities and contaminants and have a pH value of 3.5–8.

The maintenance of the above-mentioned conditions relating to the fructose solution is necessary since, when solutions having a pH lower than 3.5 are used during the process according to the present invention, there are formed reaction and decomposition products which inhibit the crystallization. When solutions having a pH value above 8.5 are used during the process a "caramelization" takes place, i.e. the solutions and thus also the end products become strongly discolored. It has been found that most advantageous results are obtained if fructose solutions having a pH of 5–6.5 are used since then the working conditions and the quality of the end products obtained are at an optimum.

The maintenance of the other conditions set out above i.e., water content, temperature control etc. are more or less necessary for the carrying out of the process according to the present invention.

Thus, for example, in the case of a water content in the concentrated fructose solutions of less than 2 percent and crystallization temperatures below 60° C., the rate of crystallization decreases considerably because of the high viscosity. Furthermore, the end products obtained are glass-like, i.e. there is obtained a mixture of crystals and supercooled melt. In the case of water contents of more than 5 percent and temperatures above 85° C., the concentrated solution remains unchanged, in spite of the seeding and/or the seed crystals dissolve in the melt. Therefore, it is preferable to use solutions which contain between 2.5 and 3.5 percent water.

The optimum crystallization temperatures depends upon the water content and the degree of purity of the concentrated fructose solution and decreases markedly with increasing water content and increasing amounts of impurities. Because of the dependence of the crystallization time on the temperature, this must also be maintained as exactly as possible, even during the crystallization phase, whereby the heat of crystallization and the frictional heat are to be taken into account as important factors. In the end phase, even the frictional heat can bring about, in the crystallization, the establishment of a stationary equilibrium state between melt and crystals and that the crystalline mass obtained according to the invention only crystallizes further when it is no longer kneaded. Only after the expiration of this "after crystallization" or "ripening time," i.e. the time of slow cooling, can the solidified crystalline mass thereby obtained be easily comminuted and subsequently dried at temperatures below 65° C., and preferably at a temperature of between 40 and 60° C., without a pasting or renewed melting of the mass taking place.

For the carrying out of the process according to the present invention, an aqueous fructose solution meeting the above set out requirements is concentrated as quickly and as accurately as possible to a water content of 2.5–3.5 percent, in which connection there are used temperatures which are preferably below 100° C. and most preferably temperatures of 80–90° C. The solutions so concentrated are cooled, preferably to about 70° C., then mixed with about 10 percent crystalline fructose and thereafter intensively stirred. After an initial period of about 10–20 minutes, a clearly visible crystallization sets in which can also be ascertained, inter alia, by an increase of the temperature.

For the seeding, there can, in principle, be used all kinds of anhydrous, crystalline fructose, for example, fructose which has been obtained by crystallization from methanol or ethanol (c.f. Ullmann, loc. cit.) or alternatively the crystalline frutose product obtained by the process according to the present invention. However, the undried crystalline mass, such as is obtained in the course of the process according to the present invention, is especially suitable since the initial period up to the commencement of intensive crystallization is the shortest in the case of the use of this crystalline mass. Depending upon the nature of the seed crystals used, 30–50 minutes after the seeding there is produced a viscous crystalline mass which can be kneaded in any desired manner and which solidifies completely upon slow cooling. The completely solidified and completely crystallized mass is comminuted, ground and subsequently dried in a vacuum or with warm air at temperatures of about 40–60° C.

Depending upon the degree of purity of the initially used fructose solution, the end product obtained by the process according to the present invention consists almost completely of anhydrous, crystalline fructose which, in this form, is neither sticky nor deliquescent in moist air. However, because of its fine crystalline structure, the fructose so produced dissolves very quickly in water and alcohol and, indeed, more quickly than fructose obtained by crystallization from methanol.

An important advantage of the new process according to the present invention for the production of crystalline fructose in comparison with all previously known processes, is that it can be carried out not only in batchwise operations but also completely continuously, the process thereby becoming particularly interesting and advantageous from the technical point of view. For this purpose, the fructose solution concentrated according to the process of the present invention is fed by means of a dosing pump to one side of a seed bed and, at the same rate, the almost completely crystallized mass is removed from the opposite side of the bed. In the case of this method of working, the initial period up to the commencement of crystallization is dispensed with, this period being necessary in the case of the discontinuous process. The completely crystallized mass is thereafter, for example, pressed into strands which, after slow cooling, are comminuted and ground.

In a preferred manner of carrying out the continuous process, the mass, which is already well crystallized, is passed down a vertical tube, provided with a double jacket through which water heated to a temperature of about 75–85° C., is circulated and into a heatable and coolable, self-cleaning and kneading screw conveyor. If desired, the crystalline mass is forced out from the end of the screw conveyor through a perforated plate to provide a bundle of strands which is cooled with warm air, ground and dried. By means of a relatively high temperature in the connecting pipe between the stirring vessel and the screw conveyor, there is avoided an adhesion of the mass on the wall of the pipe.

Further important advantages of the new process according to the present invention, in comparison with the previously known and used processes for the production of crystalline fructose, are that the yield is quantitative, no mother liquors are formed, no losses of solvents occur, no expenses for the working up of mother liquors and of solvents arise and the expenditure on apparatus and time is very low.

A more comprehensive understanding of the invention can be obtained by referring to the following illustrative examples which are not intended, however, to be unduly limitative of the invention.

Example 1

An approximately 70 percent aqueous fructose solution having a pH of 5.5 and a glucose content of about 1 percent was carefully concentrated in a vacuum to a water content of 3 percent, the temperature of the concentrate thereby amounting to about 80° C.

3 kg. of this concentrate were poured onto a flat plate made of stainless steel and stirred thereon with a spatula until the solution had cooled to about 70° C. 0.3 kg. of crystalline, anhydrous fructose were now uniformly worked in by intensive stirring, the temperature thereby dropping to about 65° C. The plate was thereafter placed in a drying oven at 60° C. and thoroughly mixed at intervals of 10 minutes.

Depending on the nature of the seed crystals used, after 15–30 minutes a noticeable cloudiness can be seen and the temperature of the mixture increases. The initial period is the shortest in the case where an un-dried crystalline product from a previous batch is used.

After about 2 hours, the crystallization was substantially completed and a hard but still smeary mass had been formed. The plate was then removed from the drying oven and the mass allowed to cool slowly at room temperature. After about 2 hours, the resultant crystalline mass was removed from the plate, comminuted and dried in a vacuum at 50° C.

Example 2

2 kg. of the fructose concentrate, having a water content of 3 percent and a temperature of 80° C., obtained according to Example 1, were poured into a kneader trough having a working volume of 2 litres. The base of the kneader trough was provided with a double wall for heating and cooling purposes, and was heated with water at a temperature of 60° C. The kneader shafts (Beken principle) are equipped with two kneader paddles which intermesh deeply with one another, rotate at a speed of 20–40 r.p.m. and thus rub against one another. A sensitive thermometer was introduced through a hole in the lid of the kneader, thus permitting an accurate measurement of the internal temperature. After the fructose concentrate had been placed in the kneader, the lid was closed and the kneader set into operation. As soon as the temperature had dropped to 70° C., 0.2 kg. of seed crystals were added and kneading was continued. After about 15 minutes, the temperature started to increase. After a further 15 minutes, the contents of the kneader were so viscous that the kneader had to be stopped. The contents, which now had the consistency of putty and a temperature of 72° C., were removed, formed into pieces having diameter of about 5 cm. and allowed to remain at room temperature. As soon as the pieces had cooled to a temperature of about 25° C., they were ground up and dried in an air circulating drying cabinet supplied with air at a temperature of 60° C.

Example 3

The kneader as described in Example 2 was sealed by means of a special lid which, apart from the opening for the insertion of the thermometer, also had an opening at the right inner edge of the kneader and another such opening at the left inner edge of the kneader. There was fed in, through one of the openings using a dosing pump, a regulatable amount of fructose concentrate and on the other side through the other opening the corresponding amount of crystalline, kneadable mass was forced out. On the inner side of the kneader lid there were also provided two deflection plates which, although they do not come into contact with the kneader paddles, deflect the freshly entering concentrate directly into the stirring zone. The kneader trough was first heated to 50° C. with warm water, 2 kg. of the fructose concentrate obtained according to Example 1 were placed therein, cooled to 70° C. and seeded with 0.4 g. of kneadable crystalline mass. After a kneading time of about 30 minutes, the first fresh concentrate having a temperature of about 80° C. was pumped in at a rate of 4 litres/hour and, a short time afterwards, the first crystalline mass forced out, formed into strands of 4 cm. diameter and left to stand at room temperature. The further working up takes place in the manner described in the preceding examples. The consistency of the discharged mass was regulated with the help of the temperature of the heating water.

Example 4

0.4 kg. of the ground end product of a previously produced batch was introduced into the kneader provided with a special lid as described in Example 3, which was heated to 50° C. with wtaer. There were then run into the kneader 4 litres/hour of a concentrate having a temperature of 80° C. (see Example 1). After about 30 minutes, the first well crystallized mass appeared at the exit opening of the lid. The further working up takes place in the manner described in the preceding examples.

Example 5

5.5 kg. of a fructose concentrate produce according to Example 1 was placed in a double-walled, 6 litre mixing kettle equipped with a planet mixer and pre-heated to 60° C. The stirring mechanism, the planet stirrer of which rotates at a rate of 31.5 r.p.m. and kneader arms of which rotate at a rate of 94.5 r.p.m. was switched on. As soon as the contents of the kettle had cooled to 70° C. they were seeded with 0.55 kg. of crystalline fructose mass from a preceding batch and stirring continued. After about 40 minutes, there was obtained a well crystalline mass which, under the given conditions, did not undergo any changes, i.e. it was in a state of equilibrium. For further working up, the contents of the mixing kettle were removed and treated according to the procedure described in the preceding examples.

Example 6

In a planet mixer provided with a special stirring kettle, there was placed 0.5 kg. of a crystalline fructose mass as a seed mass. The kettle was double-walled and was provided with one pipe in the base of the stirring kettle and with another pipe on the opposite side situated about ⅘ of the way up the wall of the kettle. The kettle was heated with water to 50° C. Through the lower pipe, which had a diameter of 15 mm., there was fed in, at a rate of 15 kg./hour, a fructose concentrate having a water content of 3 percent and a temperature of 80° C. After about 30 minutes, the first well crystallized, kneadable fructose mass was discharged from the upper pipe which had a diameter of 50 mm. The further working up took place following the procedure in the preceding examples.

Example 7

There was attached to the exit pipe of the special stirring kettle described in Example 6, a vertical, double-walled pipe having an internal diameter of 80 mm. which was heated to 75° C. by circulating water. At its lower end, the pipe was attached to the entry pipe of a heatable and coolable, self-cleaning kneading screw conveyor having a diameter of 46 mm. At the end of the screw conveyor, there was provided a perforated plate with conical, outwardly running 3 mm. bores. The screw conveyor was provided with a double wall through which water was passed at a temperature of 40° C.

The planet mixer was set into operation in the manner described in Example 6 and the kneadable mass passed through the double-walled tube into the screw conveyor.

At the end of the screw conveyor, there were discharged strands of about 3 mm. diameter, which were slowly cooled with air at a temperature of about 60° C., thereafter finely ground and subsequently dried. The finely crystalline powder thereby obtained could be packed immediately, stored and shipped.

Instead of the above-described screw conveyor, there could also be used a self-cleaning, double-screw heat exchanger with equally advantageous results.

I claim:

1. Process for the recovery of crystalline fructose from aqueous solutions thereof having a pH of 3.5 to 8 and wherein the fructose is at least 95 percent of the dissolved solids, which comprises concentrating said aqueous solution in a vacuum to a water content of 2 to 5 percent, based on the weight of total composition, cooling said concentrate to 60 to 85° C., then seeding said cooled concentrate with crystalline fructose, stirring said seeded concentrate at 60 to 85° C. until a kneadable crystalline mass is formed, and allowing the crystalline mass to solidify.

2. Process according to claim 1 wherein said seeding is effected by introduction of crystalline fructose in an amount of about 10 percent.

3. Process according to claim 1 wherein said seeding is carried out with an undried crystalline mass of fructose.

4. Process according to claim 1 wherein said aqueous solution of fructose used as starting material has a pH of from 5–6.5.

5. Process according to claim 1 wherein said aqueous solution of fructose is concentrated in vacuum to a water content of from 2.5–3.5 percent.

6. Process according to claim 1 wherein said fructose solution is continuously concentrated, said concentrate introduced into a zone constituting a seed bed, the crystalline mass thereby formed continuously withdrawn and introduced into a kneading zone and the resultant kneaded crystalline mass continuously removed from said kneading zone, comminuted and thereafter dried.

7. Process according to claim 1 wherein said solidified crystalline mass is comminuted and thereafter dried at a temperature below 65° C.

8. Process according to claim 7 wherein said comminuted mass is dried at a temperature of 40–60° C.

9. Process according to claim 1 wherein said seeding is carried out with anhydrous crystalline fructose.

10. Process according to claim 9 wherein said anhydrous crystalline fructose has been obtained by crystallization from a member selected from the group consisting of methanol and ethanol.

11. Process according to claim 1 which comprises introducing said concentrate into a zone constituting a seed bed and removing crystallized material from said seed bed at the same rate.

12. Process according to claim 11 wherein said introduction of concentrate and removal of crystallized material is carried out continuously.

References Cited

UNITED STATES PATENTS

| | | | |
|---|---|---|---|
| 2,369,231 | 2/1945 | Harding | 127—60 X |
| 2,588,449 | 3/1952 | Young | 127—30 |
| 3,265,533 | 8/1966 | Meisel | 127—58 X |

FOREIGN PATENTS

| | | |
|---|---|---|
| 1,093,750 | 11/1960 | Germany. |

MORRIS O. WOLK, Primary Examiner

S. MARANTZ, Assistant Examiner

U.S. Cl. X.R.

127—30, 60